United States Patent
Clark et al.

(10) Patent No.: US 8,527,703 B1
(45) Date of Patent: Sep. 3, 2013

(54) CACHE MANAGEMENT SYSTEM AND METHOD

(75) Inventors: Roy E. Clark, Hopkinton, MA (US); Kiran Madnani, Framingham, MA (US); David W. DesRoches, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 497 days.

(21) Appl. No.: 12/488,147

(22) Filed: Jun. 19, 2009

(51) Int. Cl.
*G06F 12/08* (2006.01)

(52) U.S. Cl.
USPC .................... 711/118; 711/119; 711/E12.017

(58) Field of Classification Search
USPC .................................. 711/118, 119, E12.017
See application file for complete search history.

(56) References Cited

U.S. PATENT DOCUMENTS

| | | | | |
|---|---|---|---|---|
| 6,308,169 B1 * | 10/2001 | Ronstrom et al. | ............ | 707/610 |
| 6,898,666 B1 * | 5/2005 | Henry et al. | ................... | 711/114 |
| 2008/0215813 A1 * | 9/2008 | Igarashi et al. | ............... | 711/114 |
| 2009/0063941 A1 * | 3/2009 | Moats et al. | .................. | 714/800 |
| 2010/0232057 A1 * | 9/2010 | Sanvido et al. | ............ | 360/78.04 |
| 2010/0262578 A1 * | 10/2010 | Arimilli et al. | ............... | 707/609 |

* cited by examiner

*Primary Examiner* — Yong Choe
(74) *Attorney, Agent, or Firm* — Brian J. Colandreo; Pamela K. Soggu; Holland & Knight LLP

(57) ABSTRACT

A method and computer program product for dividing a cache memory system into a plurality of cache memory portions. Data to be written to a specific address within an electromechanical storage system is received. The data is assigned to one of the plurality of cache memory portions, thus defining an assigned cache memory portion. Association information for the data is generated, wherein the association information defines the specific address within the electromechanical storage system. The data and the association information is written to the assigned cache memory portion.

A method and computer program product for receiving a data read request concerning requested data stored at a specific address within an electromechanical storage system. A potential cache memory portion within a cache memory system may be identified, wherein the potential cache memory portion is chosen from a plurality of cache memory portions included within the cache memory system. The potential cache memory portion may be read to obtain portion content, wherein the portion content includes portion data stored within the potential cache memory portion and association information concerning the portion data. The association information may be processed to determine if the portion data is equivalent to the data stored at the specific address within the electromechanical storage system.

15 Claims, 4 Drawing Sheets

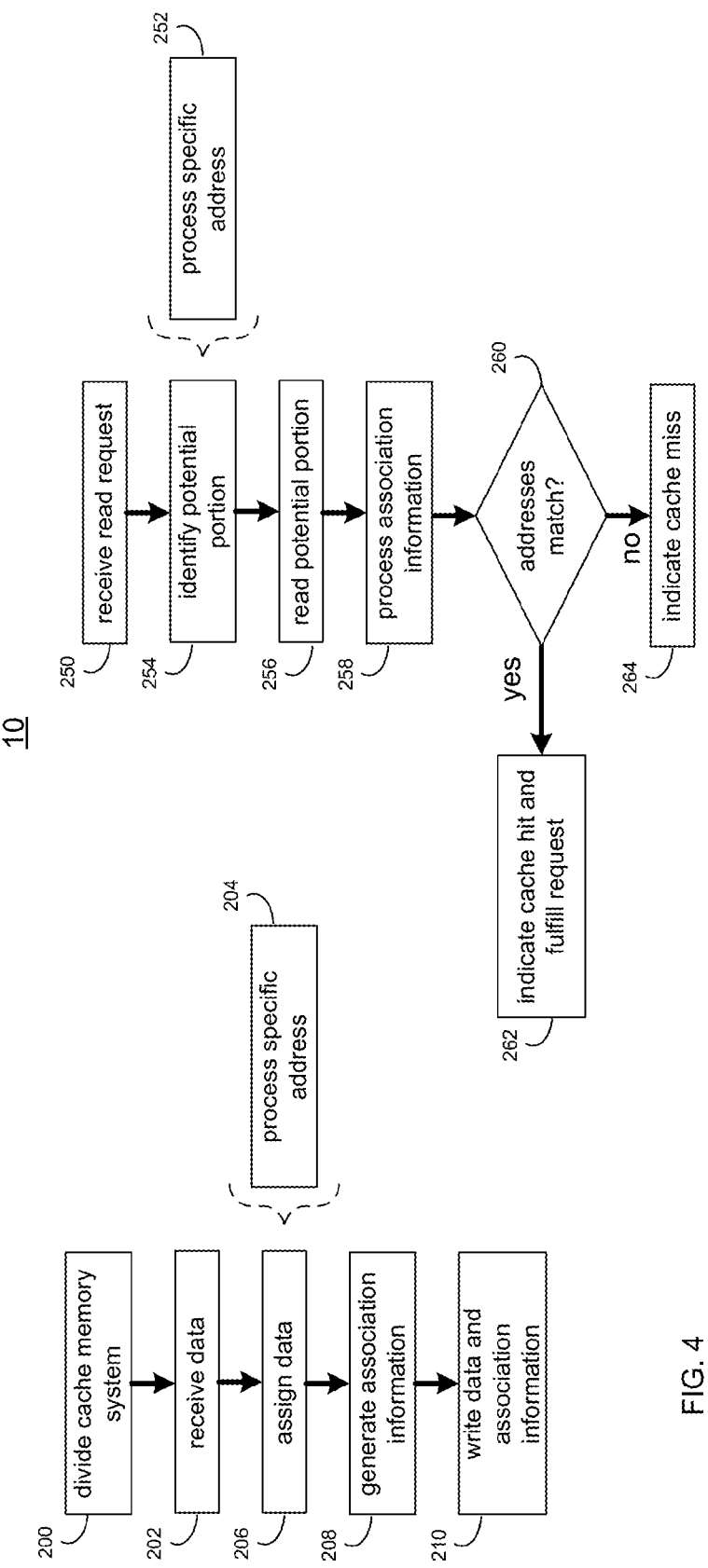

CACHE MANAGEMENT SYSTEM AND METHOD

TECHNICAL FIELD

This disclosure relates to storage networks and, more particularly, to cache management processes within a storage network.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a computer-implemented method includes dividing a cache memory system into a plurality of cache memory portions. Data to be written to a specific address within an electromechanical storage system is received. The data is assigned to one of the plurality of cache memory portions, thus defining an assigned cache memory portion. Association information for the data is generated, wherein the association information defines the specific address within the electromechanical storage system. The data and the association information are written to the assigned cache memory portion.

One or more of the following features may be included. At least one of the plurality of cache memory portions may be a cache memory page and the specific address may be an LBA (Logical Block Address). The electromechanical storage system may include a RAID array of hard disk drives. Assigning the data to one of the plurality of cache memory portions may include processing the specific address to define the assigned cache memory portion. The cache memory system may be a solid-state cache memory system.

In another implementation, a computer program product resides on a computer readable medium that has a plurality of instructions stored on it. When executed by a processor, the plurality of instructions cause the processor to perform operations including dividing a cache memory system into a plurality of cache memory portions. Data to be written to a specific address within an electromechanical storage system is received. The data is assigned to one of the plurality of cache memory portions, thus defining an assigned cache memory portion. Association information for the data is generated, wherein the association information defines the specific address within the electromechanical storage system. The data and the association information are written to the assigned cache memory portion.

One or more of the following features may be included. At least one of the plurality of cache memory portions may be a cache memory page and the specific address may be an LBA (Logical Block Address). The electromechanical storage system may include a RAID array of hard disk drives. Assigning the data to one of the plurality of cache memory portions may include processing the specific address to define the assigned cache memory portion. The cache memory system may be a solid-state cache memory system.

In another implementation, a computer-implemented method includes receiving a data read request concerning requested data stored at a specific address within an electromechanical storage system. A potential cache memory portion within a cache memory system is identified, wherein the potential cache memory portion is chosen from a plurality of cache memory portions included within the cache memory system. The potential cache memory portion is read to obtain portion content, wherein the portion content includes portion data stored within the potential cache memory portion and association information concerning the portion data. The association information is processed to determine if the portion data is equivalent to the data defined by the specific address within the electromechanical storage system.

One or more of the following features may be included. At least one of the plurality of cache memory portions may be a cache memory page and the specific address may be an LBA (Logical Block Address). The electromechanical storage system may include a RAID array of hard disk drives. Identifying a potential cache memory portion within a cache memory system may include processing the specific address to define the potential cache memory portion. The cache memory system may be a solid-state cache memory system. If the portion data is equivalent to the data stored at the specific address within the electromechanical storage system, a cache hit may be indicated and the data read request may be fulfilled with the portion data. If the portion data is not equivalent to the data stored at the specific address within the electromechanical storage system, a cache miss may be indicated.

In another implementation, a computer program product resides on a computer readable medium that has a plurality of instructions stored on it. When executed by a processor, the plurality of instructions cause the processor to perform operations including receiving a data read request concerning requested data stored at a specific address within an electromechanical storage system. A potential cache memory portion within a cache memory system may be identified, wherein the potential cache memory portion is chosen from a plurality of cache memory portions included within the cache memory system. The potential cache memory portion may be read to obtain portion content, wherein the portion content includes portion data stored within the potential cache memory portion and association information concerning the portion data. The association information may be processed to determine if the portion data is equivalent to the data defined by the specific address within the electromechanical storage system.

One or more of the following features may be included. At least one of the plurality of cache memory portions may be a cache memory page and the specific address may be an LBA (Logical Block Address). The electromechanical storage system may include a RAID array of hard disk drives. Identifying a potential cache memory portion within a cache memory system may include processing the specific address to define the potential cache memory portion. The cache memory system may be a solid-state cache memory system. If the portion data is equivalent to the data stored at the specific address within the electromechanical storage system, a cache hit may be indicated and the data read request may be fulfilled with the portion data. If the portion data is not equivalent to the data stored at the specific address within the electromechanical storage system, a cache miss may be indicated.

The details of one or more implementations are set forth in the accompanying drawings and the description below. Other features and advantages will become apparent from the description, the drawings, and the claims.

BRIEF DESCRIPTION OF THE DRAWINGS

FIG. 4 is a flowchart of a data write process executed by the cache management process of FIG. 1; and FIG. 5 is a flowchart of a data read process executed by the cache management process of FIG. 1.

Like reference symbols in the various drawings indicate like elements.

DETAILED DESCRIPTION OF THE PREFERRED EMBODIMENTS

Figure 1:
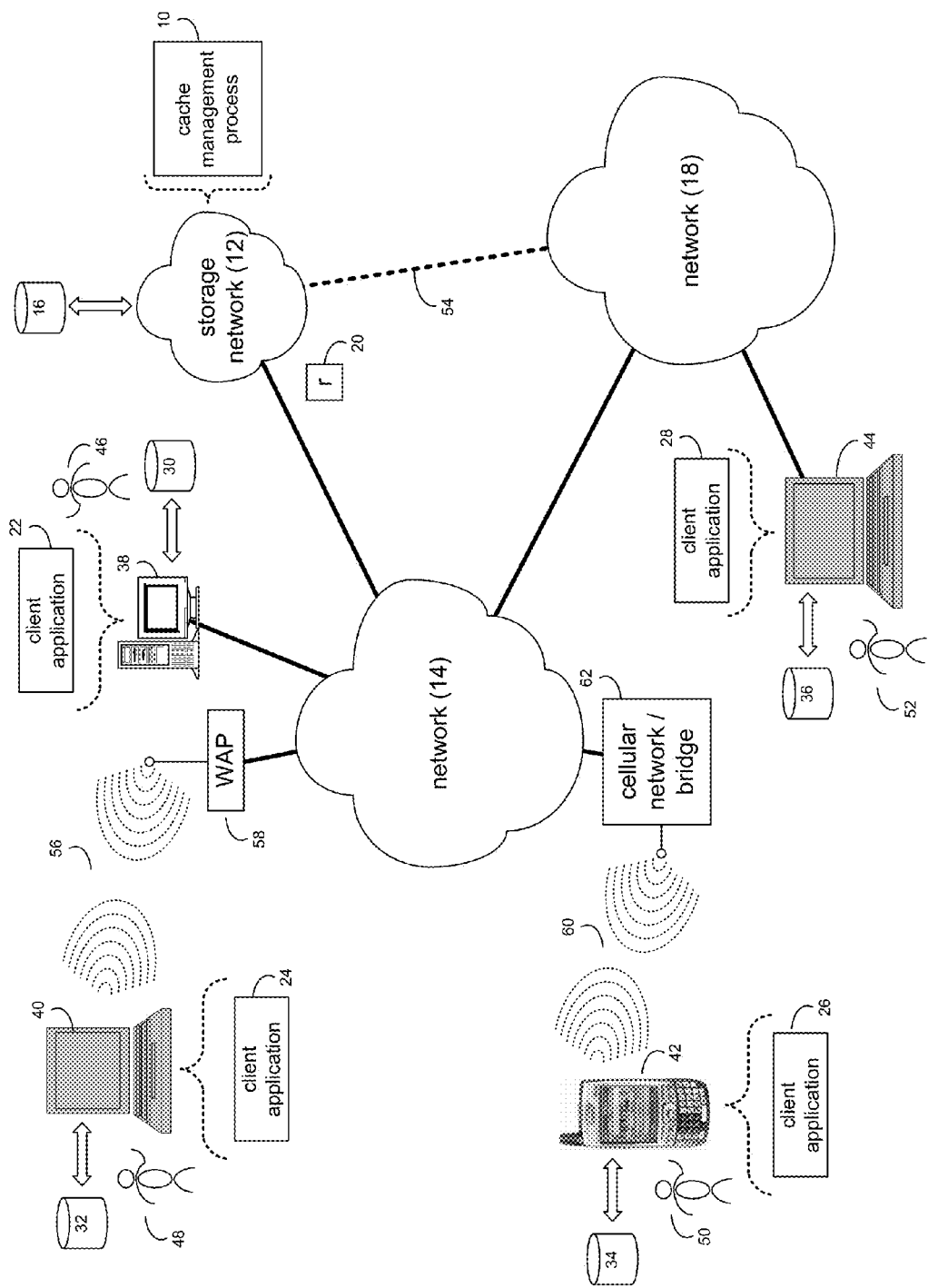
FIG. 1 is a diagrammatic view of a storage network and a cache management process coupled to a distributed computing network.

System Overview:

Referring to FIG. 1, there is shown cache management process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, when writing data, cache management process 10 may divide a cache memory system into a plurality of cache memory portions. Data to be written to a specific address within an electromechanical storage system may be received. The data may be assigned to one of the plurality of cache memory portions, thus defining an assigned cache memory portion. Association information for the data may be generated, wherein the association information defines the specific address within the electromechanical storage system. The data and the association information may be written to the assigned cache memory portion.

Further, when reading data, cache management process 10 may receive a data read request concerning requested data stored at a specific address within an electromechanical storage system. A potential cache memory portion within a cache memory system may be identified, wherein the potential cache memory portion may be chosen from a plurality of cache memory portions included within the cache memory system. The potential cache memory portion may be read to obtain portion content, wherein the portion content may include portion data stored within the potential cache memory portion and association information concerning the portion data. The association information may be processed to determine if the portion data is equivalent to the data stored at the specific address within the electromechanical storage system The instruction sets and subroutines of cache management process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that data be written to storage network 12) and data read requests (i.e. a request that data be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with link line 54 (shown in phantom).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Cache Management Process:

For the following discussion, client application 22 is going to be described for illustrative purposes. However, this is not intended to be a limitation of this disclosure, as other client applications (e.g., client applications 24, 26, 28) may be equally utilized.

Figure 2:
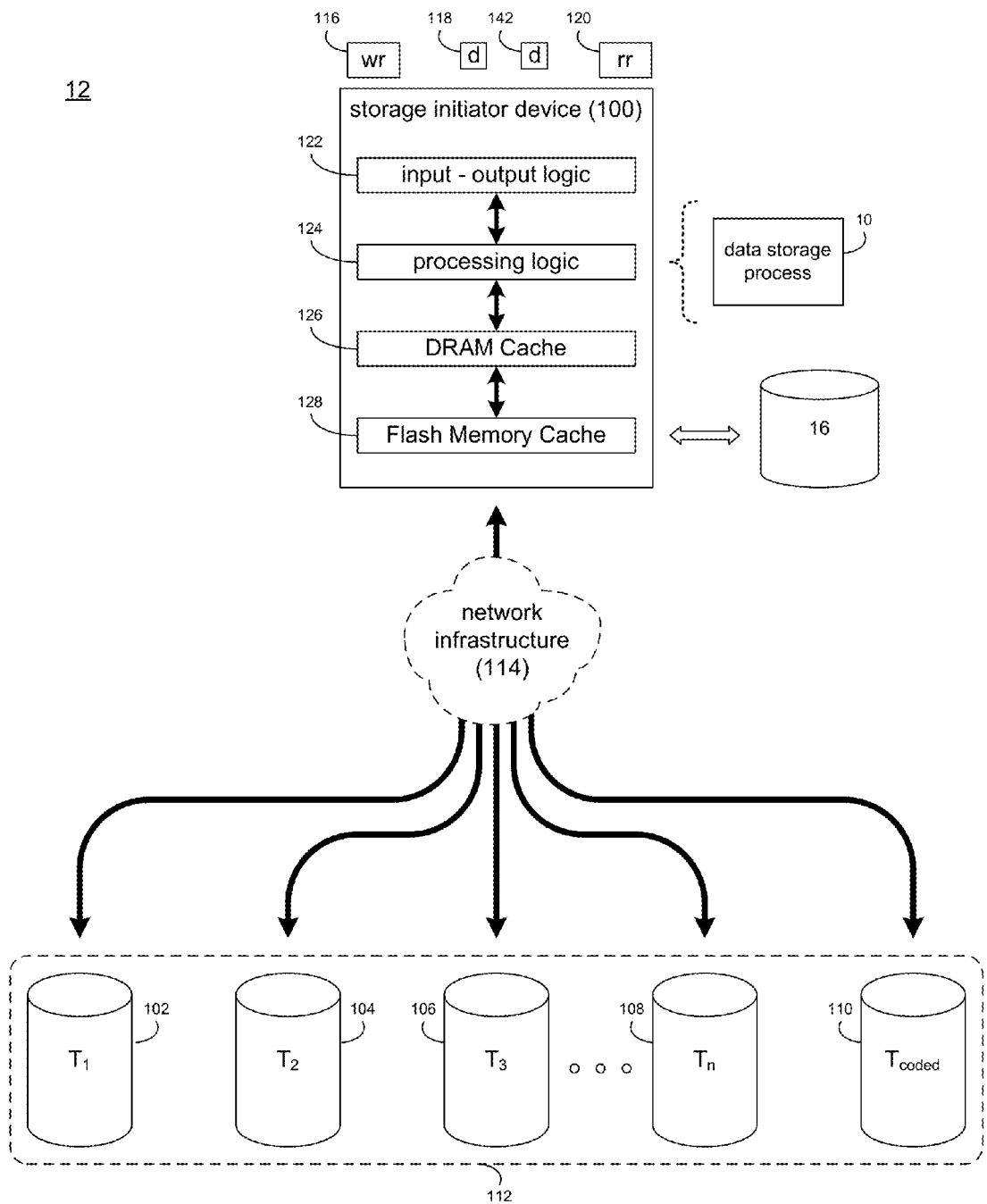
FIG. 2 is a diagrammatic view of the storage network of FIG. 1.

Referring also to FIG. 2, storage network 12 may include a storage initiator device (e.g. storage initiator device 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 102, 104, 106, 108 may be configured as a RAID 1 array, in which data is mirrored between storage targets. By mirroring data between storage targets, a level of high availability is achieved as multiple copies of the data are stored within storage network 12.

While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage network 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage targets 102, 104, 106, 108 and coded target 110 may form non-volatile, electromechanical memory system 112.

The manner in which storage network 12 is implemented may vary depending upon e.g. the level of redundancy/performance/capacity required. For example, storage network 12 may be a RAID device in which storage initiator device 100 is a RAID controller card and storage targets 102, 104, 106, 108 and/or coded target 110 are individual "hot-swappable" hard disk drives. An example of such a RAID device may include but is not limited to an NAS device. Alternatively, storage network 12 may be configured as a SAN, in which storage initiator device 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage network 12 is configured as a SAN, the various components of storage network 12 (e.g. storage initiator device 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage initiator device 100 may execute all or a portion of cache management process 10. The instruction sets and sub-routines of cache management process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID device; a random access memory (RAM); and a read-only memory (ROM).

As discussed above, various data requests (e.g. data request 20) may be sent from client applications 22, 24, 26, 28 to storage network 12, and examples of data request 20 may include but are not limited to data write request 116 (i.e. a request that data 118 be written to storage network 12) and data read request 120 (i.e. a request that data 118 be read from storage network 12).

As will be discussed below in greater detail, storage initiator device 100 may include input-output logic 122 (e.g., a network interface card), processing logic 124, volatile, solid-state, cache memory system 126 (e.g., a dynamic RAM cache memory system), and non-volatile, solid-state, cache memory system 128 (e.g., a flash-based, cache memory system).

During operation of storage initiator device 100, data (e.g. data 118) to be written to storage network 12 may be received by input-output logic 122 (e.g. from network 14 and/or network 18) and processed by processing logic 124. As will be discussed below in greater detail, processing logic 124 may initially store data 118 within volatile, solid-state, cache memory system 126, and may subsequently destage data 118 to non-volatile, solid-state, cache memory system 128. Processing logic 124 may then destage data 118 to the storage targets (e.g. storage targets 102, 104, 106, 108) included within non-volatile, electromechanical memory system 112. Additionally, processing logic 124 may calculate and store coded data on coded target 110 (included within non-volatile, electromechanical memory system 112) that may allow for the regeneration of data lost/corrupted on one or more of storage targets 102, 104, 106, 108.

While not as fast as volatile, solid-state, cache memory system 126, non-volatile, solid-state, cache memory system 128 may be considerably quicker than non-volatile, electromechanical memory system 112. Accordingly, non-volatile, solid-state, cache memory system 128 may be sized so that the number of times that non-volatile, electromechanical memory system 112 is accessed may be reduced. Accordingly, by sizing non-volatile, solid-state, cache memory system 128 so that non-volatile, solid-state, cache memory system 128 retains a quantity of data sufficient to satisfy a significant quantity of data requests (e.g., data request 20), the overall performance of storage network 12 may be enhanced.

Figure 3:
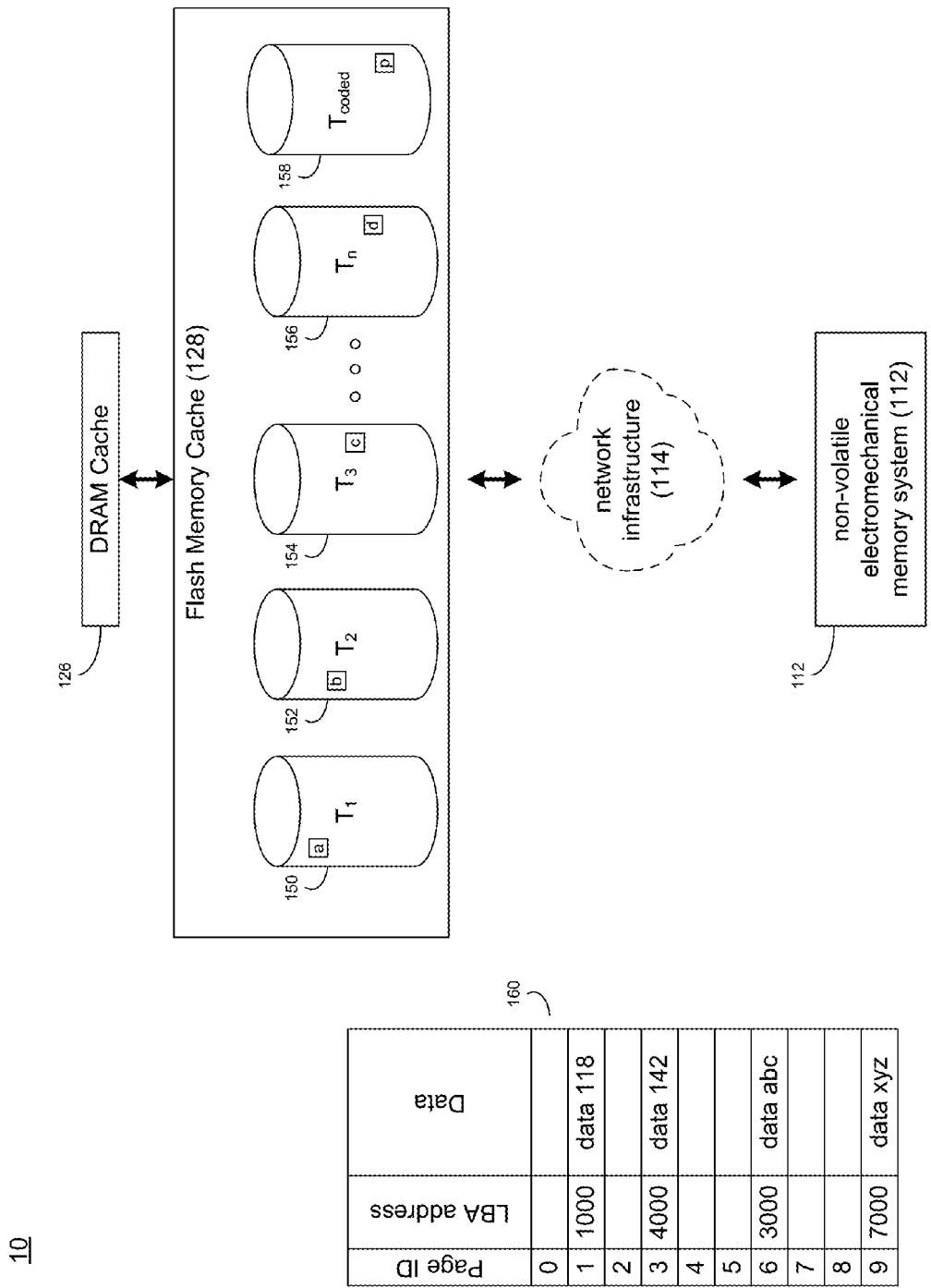
FIG. 3 is a diagrammatic view of a non-volatile, solid-state, cache memory system included within the storage network of FIG. 1.

Referring also to FIG. 3, non-volatile, solid-state, cache memory system 128 may include a plurality of flash solid-state storage devices (e.g. flash solid-state storage devices 150, 152, 154, 156, 158). The plurality of flash solid-state storage devices (e.g. flash solid-state storage devices 150, 152, 154, 156, 158) included within non-volatile, solid-state, cache memory system 128 may be configured as a RAID device that defines coded data.

Accordingly, one or more of the flash solid-state storage devices (e.g. flash solid-state storage devices 150, 152, 154, 156) may be configured as storage targets for storing various data portions received from volatile, solid-state, cache memory system 126 and/or non-volatile, electromechanical memory system 112. Further, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156.

For illustrative purposes, assume that data 118 is to be written to non-volatile, solid-state, cache memory system 128. Data 118 may be received from volatile, solid-state, cache memory system 126 or from non-volatile, electromechanical memory system 112. For example, data 118 may be received from network 14 or network 18 for storage upon storage network 12. Upon being received by input-output logic 122, cache management process 10 (which may be executed on processing logic 124) may provide data 118 to volatile, solid-state, cache memory system 126. Volatile, solid-state, cache memory system 126 may maintain data 118 until cache management process 10 determines that data 118 has grown "cold". Data 118 may be deemed "cold" when input-output logic 122 has not read data 118 from volatile, solid-state, cache memory system 126 for a length of time sufficient to deem the continued storage of data 118 within volatile, solid-state, cache memory system 126 unnecessary.

Upon cache management process 10 determining that data 118 stored within volatile, solid-state, cache memory system 126 has grown "cold", cache management process 10 may destage data 118 to non-volatile, solid-state, cache memory system 128.

When storing data within volatile, solid-state, cache memory system 126 and/or non-volatile, solid-state, cache memory system 128, cache management process 10 needs to store the data within the cache memory system in a manner that allows for subsequent retrieval. Accordingly, data to be written to volatile, solid-state, cache memory system 126 and/or non-volatile, solid-state, cache memory system 128 may be processed by cache management process 10 to determine the appropriate memory location within volatile, solid-state, cache memory system 126 and/or non-volatile, solid-state, cache memory system 128 for storing the data.

For the following discussion and for illustrative purposes only, non-volatile, solid-state, cache memory system 128 is going to be described and discussed. However, other configurations of cache management process 10 are possible and the following discussion may be equally applied to any cache memory system. Accordingly, the following discussion and the scope of this disclosure may also be applied to volatile, solid-state, cache memory system 126. Accordingly, cache management process 10 may equally effectuate the management of volatile, solid-state, cache memory system 126 and/or non-volatile, solid-state, cache memory system 128.

The Cache Write Process:

Referring also to FIG. 4, cache management process 10 may divide 200 non-volatile, solid-state, cache memory system 128 into a plurality of cache memory portions 160, examples of which may include but are not limited to cache memory pages. In this particular example, non-volatile, solid-state, cache memory system 128 is shown to be divided into ten (10) cache memory pages, designated as cache memory pages "0" through "9". A typical example of such a cache memory page is a 16 kilobyte cache memory page.

When data is ready to be written to e.g., non-volatile, electromechanical memory system 112, a specific address is provided that defines the address within non-volatile, electromechanical memory system 112 at which the data is to be stored. This address may be defined by e.g., storage initiator 100. A typical example of an addressing scheme used to define the specific address within non-volatile, electromechanical memory system 112 is an LBA (Logical Block Address) that may define an offset from the beginning of a storage target.

Upon receiving 202 data to be written to a specific address within non-volatile, electromechanical memory system 112, the specific address included within the data may be processed 204 by cache management process 10 to assign 206 the data received to one of the plurality of cache memory portions 160 (e.g., one of cache memory pages "0"-"9"). An example of the manner in which cache management process 10 may process 204 the specific address is via a hashing algorithm. An example of such a hashing algorithm is SHA1 and Simple XOR Address Folding.

Once assigned 206 to one of the plurality of cache portions 160, cache management process 10 may generate 208 association information for the data, wherein the association information defines e.g., the specific address that was initially defined for storing the data within the electromechanical storage system 112. Once generated 208, cache management process 10 may write 210 the data and the association information to the assigned cache memory portion.

For example, assume that write request 116 is received 202 for writing data 118 to non-volatile, electromechanical memory system 112 at LBA1000. Depending on the manner in which storage network 12 is configured (e.g., whether or not storage network 12 includes volatile, solid-state, cache memory system 126), data 118 may first be stored within volatile, solid-state, cache memory system 126 and subsequently destaged to non-volatile, solid-state, cache memory system 128. Alternatively, data 118 may be stored directly on non-volatile, solid-state, cache memory system 128.

Upon receiving 202 data 118 for storage at LBA1000 within non-volatile, electromechanical memory system 112, cache management process 10 may process 204 the specific address using e.g., a hashing algorithm. Assume for illustrative purposes that processing 204 the LBA1000 address results in data 118 being assigned 206 to cache memory page "1". As discussed above, cache management process 10 may generate 208 association information for the data. In this particular example, the association information may define value "1000", which is representative of the LBA at which data 118 would have been stored if it had been written to non-volatile, electromechanical memory system 112. Additionally, other pieces of information may be included within this association information, examples of which may include but are not limited to timestamp, sequence-stamp, validity bitmap and dirty bit. Once the association information is generated 208, cache management process 10 may write 210 data 118 and the association information to cache memory page "1".

The Cache Read Process:

Further and referring also to FIG. 5, assume for illustrative purposes that a data read request (e.g., data read request 120) is subsequent received 250 that requests the data stored at LBA4000. Upon receiving 250 data read request 120, cache manage process 10 may process 252 LBA4000 (i.e., the specific address within non-volatile, electromechanical memory system 112 that was identified by read request 120) to identify 254 a potential cache memory portion (e.g., a potential memory page) within non-volatile, solid-state, cache memory system 128 (chosen from plurality of cache memory portions 160). The potential cache memory portion identified 254 by cache management process 10 is (in this example) the specific cache memory page within which the requested data (i.e., by read request 120) may be stored. Specifically, non-volatile, electromechanical memory system 112 is typically much larger than non-volatile, solid-state, cache memory system 128 (e.g., one terabyte versus one gigabyte). Accordingly, all of the data included within non-volatile, electromechanical memory system 112 cannot physically fit within non-volatile, solid-state, cache memory system 128. This is the reason that data is destaged (e.g., moved from non-volatile, solid-state, cache memory system 128 to non-volatile, electromechanical memory system 112). Accordingly, simply because a piece of data was once present within non-volatile, solid-state, cache memory system 128 does not mean that it will always be present within non-volatile, solid-state, cache memory system 128. Accordingly, cache management process 10 should confirm that the data requested by e.g., read request 120 is actually present within non-volatile, solid-state, cache memory system 128 at the potential cache memory portion.

Continuing with the above stated example, assume that upon processing 252 LBA4000 (i.e., the specific address identified by read request 120), cache memory page "3" is identified 254 by cache management process 10 as the potential cache memory portion. Cache management process 10 may read 256 cache memory page "3" to obtain the portion content (i.e., the content that is included within cache memory page "3"). As discussed above, the content included within cache memory page "3" may include (in this example) content data (e.g., data 142) and association information (e.g., information that identifies the location within the non-volatile, electromechanical memory system 112 at which data 142 (i.e., the content data) would have been stored.

Cache management process 10 may process 258 the association information to determine if the portion data (e.g., data 142) is equivalent to the data defined by the specific address within non-volatile, electromechanical memory system 112. Specifically, when processing 258 the association information, cache management process 10 may determine the specific address included within the association information stored at cache memory page "3" and compare it to the specific address (i.e., LBA4000) defined within read request 120.

If 260 the two addresses match, a cache hit is indicated 262 and the portion data (i.e., data 142) is deemed equivalent to the data defined by the specific address within the electromechanical storage system (and requested by data read request 120). Accordingly, data read request 120 may be fulfilled with the portion data (e.g., data 142) retrieved from cache memory page "3" and subsequently provided to the application requesting the data.

However, if 260 the two addresses do not match, a cache miss is indicated 264 and the portion data (i.e., data 142) is deemed not equivalent to the data defined by the specific address within the electromechanical storage system (and requested by data read request 120). Accordingly, data read request 120 may not be fulfilled with the portion data (e.g., data 142) retrieved from cache memory page "3". Therefore, the data requested by read request 120 (i.e., the data stored at LBA4000 within non-volatile, electromechanical memory system 112) will need to be obtained from non-volatile, electromechanical memory system 112.

A number of implementations have been described. Nevertheless, it will be understood that various modifications may be made. Accordingly, other implementations are within the scope of the following claims.

What is claimed is:

1. A computer-implemented method comprising:
   dividing a cache memory system into a plurality of cache memory portions;
   receiving data to be written to a specific address within an electromechanical storage system;
   assigning the data to one of the plurality of cache memory portions, thus defining an assigned cache memory portion;
   generating association information for the data, wherein the association information defines the specific address within the electromechanical storage system to which the data is to be written and wherein the association information includes a timestamp and a sequence stamp; and
   writing the data and the association information to the assigned cache memory portion;
   wherein the cache memory system is a non-volatile, solid-state cache memory system.

2. The computer-implemented method of claim 1 wherein at least one of the plurality of cache memory portions is a cache memory page and the specific address is an LBA (Logical Block Address).

3. The computer-implemented method of claim 1 wherein the electromechanical storage system includes a RAID array of hard disk drives.

4. The computer-implemented method of claim 1 wherein assigning the data to one of the plurality of cache memory portions includes:
   processing the specific address to define the assigned cache memory portion.

5. The computer-implemented method of claim 4, wherein processing the specific address to define the assigned cache memory portion includes:
   processing the specific address using a hashing algorithm.

6. A computer program product residing on a non-transitory computer readable storage medium having a plurality of instructions stored thereon, which, when executed by a processor, cause the processor to perform operations comprising:
   dividing a cache memory system into a plurality of cache memory portions;
   receiving data to be written to a specific address within an electromechanical storage system;
   assigning the data to one of the plurality of cache memory portions, thus defining an assigned cache memory portion;
   generating association information for the data, wherein the association information defines the specific address within the electromechanical storage system to which the data is to be written and wherein the association information includes a timestamp and a sequence stamp; and
   writing the data and the association information to the assigned cache memory portion;
   wherein the cache memory system is a non-volatile, solid-state cache memory system.

7. The computer program product of claim 6 wherein at least one of the plurality of cache memory portions is a cache memory page and the specific address is an LBA (Logical Block Address).

8. The computer program product of claim 6 wherein the electromechanical storage system includes a RAID array of hard disk drives.

9. The computer program product of claim 6 wherein the instructions for assigning the data to one of the plurality of cache memory portions include instructions for:
  processing the specific address to define the assigned cache memory portion.

10. The computer program product of claim 9 wherein processing the specific address to define the assigned cache memory portion includes:
  processing the specific address using a hashing algorithm.

11. A computing system including a processor and memory configured to perform operations comprising:
  dividing a cache memory system into a plurality of cache memory portions;
  receiving data to be written to a specific address within an electromechanical storage system;
  assigning the data to one of the plurality of cache memory portions, thus defining an assigned cache memory portion;
  generating association information for the data, wherein the association information defines the specific address within the electromechanical storage system to which the data is to be written and wherein the association information includes a timestamp and a sequence stamp; and
  writing the data and the association information to the assigned cache memory portion;
  wherein the cache memory system is a non-volatile, solid-state cache memory system.

12. The computing system of claim 11 wherein at least one of the plurality of cache memory portions is a cache memory page and the specific address is an LBA (Logical Block Address).

13. The computing system of claim 11 wherein the electromechanical storage system includes a RAID array of hard disk drives.

14. The computing system of claim 11 wherein assigning the data to one of the plurality of cache memory portions includes:
  processing the specific address to define the assigned cache memory portion.

15. The computing system of claim 14 wherein processing the specific address to define the assigned cache memory portion includes:
  processing the specific address using a hashing algorithm.

* * * * *